June 19, 1951     A. W. DU FOUR     2,557,785
NONDRIP FLUID-PRESSURE-OPENED DISCHARGE NOZZLE VALVE
Filed Nov. 29, 1945
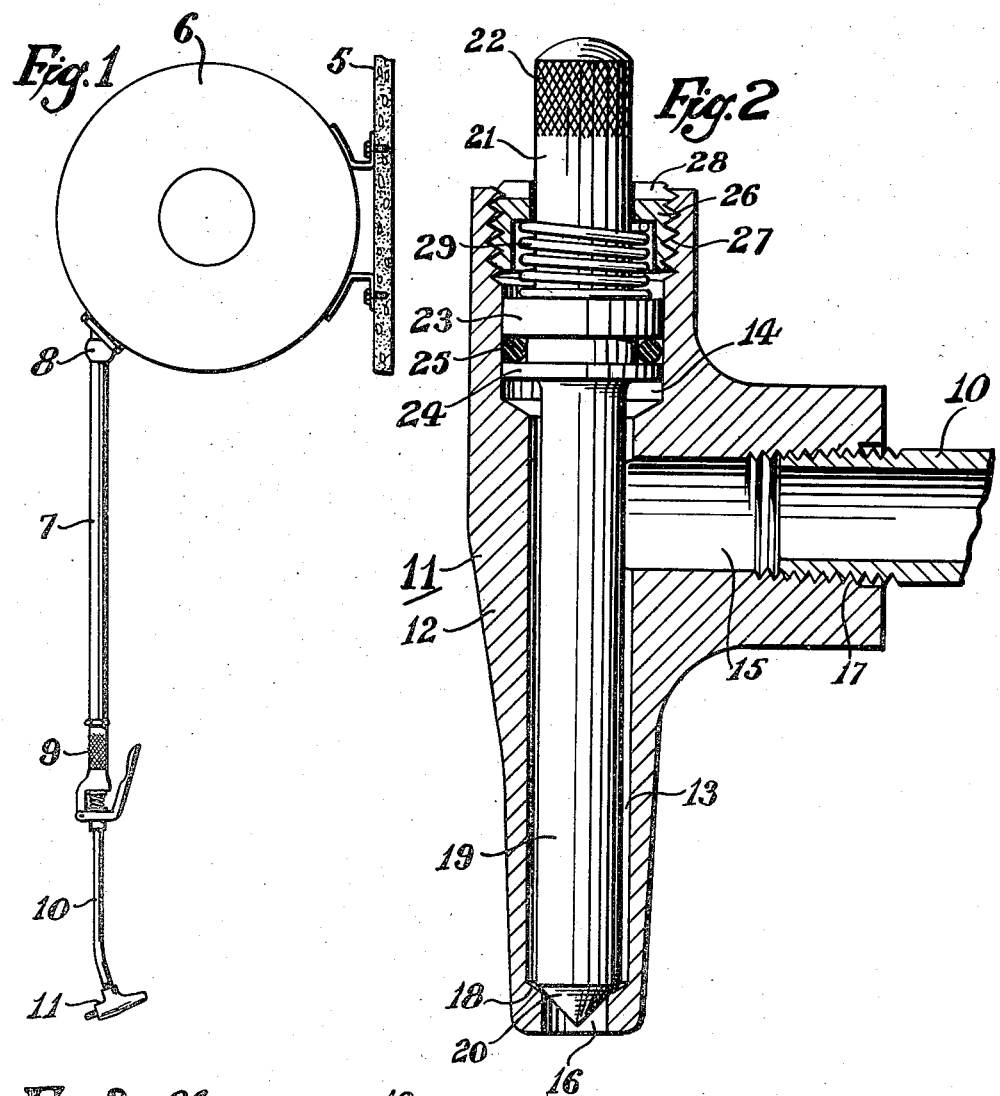
INVENTOR.
Arthur W. DuFour
BY
Leonard L. Kalish
Attorney Patented June 19, 1951

2,557,785

UNITED STATES PATENT OFFICE 2,557,785

NONDRIP FLUID-PRESSURE-OPENED DISCHARGE NOZZLE VALVE

Arthur W. Du Four, Minneapolis, Minn., assignor, by mesne assignments, to Gray Company, Inc., Minneapolis, Minn., a corporation of Minnesota Application November 29, 1945, Serial No. 631,686

1 Claim. (Cl. 251—145)

This invention relates to non-drip fluid-pressure-opened discharge-nozzle valves.

It is an object of this invention to provide such a valve having the cooperating surfaces, which control the flow of fluid through the valve, at the outlet therefrom, so that the flow of fluid is cut off positively and sharply without drip or wastage.

Other objects of this invention are to provide such a valve which is simple and easy to manufacture and use but which at the same time is very efficient in its operation.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

In the accompanying drawings, in which like reference characters refer to like parts throughout:

Figure 1 represents a view in side elevation of the present invention as it appears in use.

Figure 2 represent a view of the valve in longitudinal cross section on line 2—2 of Figure 3.

Figure 3 represents a top or plan view of the nozzle.

One embodiment of this invention has been selected, from among many which the invention may take, for illustration in the drawings and description of the specification.

In the selected embodiment, there is shown a base 5 on which is mounted a drum 6 which houses a hose 7, or like lubricant conduit. Hose 7 is retracted into drum 6 as by a spring, not shown. A ball 8 limits the extent to which the hose 7 can thus be retracted. That end of hose 7 which is within drum 6 is connected to a supply of fluid lubricant under pressure, such as oil or grease for the differential or other part of an automobile or like machine. The exposed end of hose 7 is connected to a manually operated valve 9, which controls the flow of lubricant through a pipe 10 to a nozzle, generally indicated at 11, which forms a major feature of this invention.

Figure 2 best shows that nozzle 11 has a valve-body 12 having a hollow therein formed by a bore 13 and a counterbore 14. One end of pipe 10 is connected to the inlet 15 (leading to bore 13) in the valve-body 12, as by a screw thread 17. An outlet 16 leads from the valve-body 12 and from the lower end of the bore 13 therein. Between bore 13 and outlet 16, valve-body 12 is provided with a cone-like surface 18 which forms a valve-seat.

Slidably mounted in valve-body 12 is a valve-member 19 which is spaced from the inner side of bore 13 so as to provide a cavity or space therebetween. At one end, valve-member 19 has a cone-like portion 20 cooperating with the cone-like valve-seat 18. However, it will be noted that the slope or slant of the cone-like portion 18 and of the cone-like portion 20 are different so that the engagement between these two surfaces is in the shape of a narrow ring. The opposite end of the valve-member 19 projects from the valve-body 12 in the form of a head 21 which may have a knurled portion 22 thereon. Intermediate its ends the valve-member 19 has a plurality of flanges 23 and 24 which are spaced apart and of which each engages at its outer rim with the inner surface or wall of the counterbore 14 so as to have a sliding fit therein.

A sealing-ring 25 encircles that portion of valve-member 19 between the flanges 23 and 24. Sealing-ring 25 is of compressible material and bears at its outer rim or edge against the inner wall or surface of the counterbore 14 so as to provide a sliding seal for the flange 23.

A valve-spring-tensioning cup 26 is provided in the upper end of the valve body 12 and has, on its outer surface, interengaging screw threads 27 meshing with screw threads in the upper end of the valve body 12. In its top or upper surface the cup 26 has a pair of notches or slots 28 for the reception of a tool whereby it is inserted into or removed from the valve-body 12 or rotated therein.

A valve-spring 29 bears at one end against cup 26 and at its other end against flange 23 and encircles the head 21 of the valve-member 19.

The operation of this device is as follows: When valve 9 is manually opened, the fluid lubricant under pressure enters through pipe 10 and inlet 15 into the interior of the valve-body 12. Since the valve seat 18 and the cooperating part 20 of the valve-member are engaged, the valve is closed and the pressure of the fluid presses against face of flange 24 and compresses spring 29. This causes sliding movement of member 19 in the valve-body 12 (upward in Fig. 2) and separates the valve surfaces 18 and 20. Fluid lubricant thus escapes through the outlet 16 and into whatever part of the machine it is desired to place it. When valve 9 is closed, the pressure on the fluid lubricant in inlet 15 is cut off and consequently spring 29 promptly closes part 20 against valve seat 18 thus shutting off lubricant.

in the outlet 16 without any drip or waste. Slots 28 provide means whereby cup 26 may be rotated in valve body 12 so as to adjust the tension of spring 29. The tension of spring 29 governs the pressure required to open the valve surfaces 18 and 20. Sealing-ring 25 forms a sliding-fit against the escape of fluid lubricant past the flange 23.

The present invention may be embodied in other specific forms without departing from the spirit or essential attributes thereof, and it is therefore desired that the present embodiment be considered in all respects as illustrative and not restrictive, reference being had to the appended claim rather than to the foregoing description to indicate the scope of the invention.

The purpose of the projecting-head 21 is to be grasped by the hand or fingers of the operator which engage the knurled band or portion 22. The valve-member 19 is then rotated within the body 12. This rotation cleans any dirt or foreign matter from between the cooperating valve surfaces 18 and 20. Contact between these valve surfaces at a thin ring-shaped surface is thus insured. Therefore the valve seats accurately and opens and closes quickly.

What I claim as my invention and desire to secure by Letters Patent is:

A non-drip nozzle for dispensing relatively viscous fluids or the like comprising a body having an elongated cylindrical bore formed therein and having a reduced-diameter valve-seat formed at the discharge end of said bore and having a counterbore formed at the other end of said bore and communicating therewith, said counterbore having a diameter substantially greater than that of said bore, and having an inlet conduit communicating with said bore at a point generally intermediate its ends, the discharge end of the nozzle being substantially below said inlet, a valve-member having an elongated generally cylindrical stem-portion disposed within said bore with a relatively small annular clearance and having a generally tapered valve-surface formed at one end of said stem-portion in operative juxtaposition to said valve-seat and having an enlarged cylindrical piston-portion provided with a compressible sealing-ring and constructed and arranged to slide within said counterbore in fluid-tight sealing relationship thereto and having a reduced-diameter generally cylindrical head extending from said piston-portion somewhat beyond the end of said counterbore, a cap screw-threadedly engaged within the other end of said counterbore and having a central opening through which said head extends, and a helical spring mounted upon said head intermediate said piston-portion and said cap, said spring being constructed and arranged normally to urge said valve-member into valve-closing position wherein its tapered valve-surface makes annular fluid-tight sealing contact with said valve-seat, the pressure of fluid entering through said inlet conduit acting upon the enlarged piston-portion of said valve-member to move it to valve-opening position against the pressure of said spring, said cap being axially adjustable within said counterbore thereby to vary the tension of said spring and correspondingly to vary the fluid-pressure required to open the valve, the protruding portion of said head being manually turnable to permit positioning of said valve-member independently of or supplemental to the fluid-actuated and spring-actuated movements thereof.

ARTHUR W. DU FOUR.

REFERENCES CITED

The following references are of record in the file of this patent:

UNITED STATES PATENTS

| Number | Name | Date |
|---|---|---|
| 126,982 | Pallett | May 21, 1872 |
| 569,781 | Brown | Oct. 20, 1896 |
| 966,999 | Carssow | Aug. 9, 1910 |
| 990,351 | Fitzgerald | Apr. 25, 1911 |
| 1,162,153 | Gensheimer | Nov. 30, 1915 |
| 1,507,139 | Pike | Sept. 2, 1924 |
| 1,735,718 | Attendu | Nov. 12, 1929 |
| 1,921,761 | Leins | Aug. 8, 1933 |
| 1,998,056 | Naatz | Apr. 16, 1935 |

FOREIGN PATENTS

| Number | Country | Date |
|---|---|---|
| 12,155 | Australia | of 1928 |
| 630,222 | Germany | May 23, 1936 |